US008214528B2

United States Patent
Hirata et al.

(10) Patent No.: US 8,214,528 B2
(45) Date of Patent: Jul. 3, 2012

(54) ADDRESS IDENTIFIER SCALING IN CONVERGED NETWORKS

(75) Inventors: Kenneth Hiroshi Hirata, Costa Mesa, CA (US); Stuart Bruce Berman, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 293 days.

(21) Appl. No.: 12/264,201

(22) Filed: Nov. 3, 2008

(65) Prior Publication Data

US 2010/0115132 A1    May 6, 2010

(51) Int. Cl.
    *G06F 15/16* (2006.01)
(52) U.S. Cl. ...................................... 709/245
(58) Field of Classification Search .................. 709/204, 709/220–229, 245–246; 370/270, 351–358, 370/392, 235, 460–476; 455/466, 450; 705/1–5
    See application file for complete search history.

(56) References Cited

U.S. PATENT DOCUMENTS

| 7,561,571 | B1* | 7/2009 | Lovett et al. | 370/392 |
| 2003/0012204 | A1* | 1/2003 | Czeiger et al. | 370/401 |
| 2007/0002883 | A1* | 1/2007 | Edsall et al. | 370/422 |
| 2007/0147267 | A1* | 6/2007 | Holland | 370/252 |
| 2008/0056300 | A1* | 3/2008 | Williams | 370/466 |

* cited by examiner

*Primary Examiner* — Larry Donaghue
*Assistant Examiner* — Mark O Afolabi
(74) *Attorney, Agent, or Firm* — Morrison & Foerster LLP

(57) ABSTRACT

Embodiments of the present invention allow for address scaling of existing addresses in a FC, FCoE, CEE or other type of network. More specifically, subaddresses can be used in conjunction with existing addresses, so that a combination of a subaddress and existing address can identify an addressable entity. Thus, multiple entities can be share a single existing address and be distinguished among each other by way of their respective subaddresses. Some embodiments of the invention allow for use of the inventive subaddressing scheme in conjunction with devices or network elements (e.g., gateways, switches, etc.) that may not be subaddressing aware. Further embodiments allow for the multiple distinct devices to communicate with a single Fiber Channel switching element through a single port by using N_Port_ID Virtualization.

37 Claims, 9 Drawing Sheets

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|---|---|---|---|---|---|---|---|---|---|
| Domain_ID 101 | | | | | | | | Area_ID 102 | | | | | | | | Port_ID 103 | | | | | | | |
| N_Port_ID (Address Identifier) 100 | | | | | | | | | | | | | | | | | | | | | | | |

Fig. 1

ADDRESS IDENTIFIER SCALING IN CONVERGED NETWORKS

FIELD OF THE INVENTION

The present invention is generally related to the field of computer networking and more specifically to the field of addressing in Fibre Channel and other related networks.

BACKGROUND OF THE INVENTION

Fibre Channel (FC) is a well known protocol for electronic communication. Fibre Channel networks are often used for storage networking, such as for storage area networks (SANs). Fibre Channel supports three topologies, the most flexible of which is the Switched Fabric topology which provides for the use of one or more switches to connect multiple devices to a network.

Devices that connect to a switched fabric Fibre Channel network usually connect to a specific physical port of a Fibre Channel switch. A port of an FC switch is usually referred to as an F_Port. A single physical port of a Fibre Channel enabled device is usually referred to as an N_Port. Each N_Port can be associated with an identifier referred to as N_Port_ID.

In some cases, it may be considered necessary to have two or more virtual ports at a single physical device port. This may be desirable, for example, if a single computer connected to a switch through a single physical port runs two or more virtual machines. In such a case, a separate virtual port can be used for each virtual machine. Fibre Channel provides a facility referred to as N_Port_ID Virtualization (NPIV) that allows this. More specifically, NPIV allows for multiple N_Port_IDs to be associated with a single physical port. Thus, multiple virtual ports utilizing the single physical port can use the different N_Port_IDs and, as a result, appear in ordinary Fibre Channel communications as multiple N_Ports.

Most existing switches allow a limited number of virtual ports to connect to each physical port of the switch. For example, many existing FC switches provide only 128 N_Port_IDs per physical switch port (or F_Port). This was initially considered more than sufficient for any foreseeable levels of virtualization. However, several recent developments have made this insufficient.

First, the increased use of multiple processor per computer and multiple cores per processor, as well as the ever increasing computational performance of individual cores has made higher levels of virtualization easily reachable. Furthermore, certain blade server systems may provide a single N_Port per blade server enclosure. A blade server enclosure may include dozens of individual computers (blade servers). These computers may communicate with the single N_Port through an internal bus or through an internal Fibre Channel over Ethernet (FCoE) network. Each of these computers may run multiple virtual machines which may require multiple virtual ports (and, therefore, multiple N_Port_IDs).

Thus, in many easily foreseeable cases, one or more thousands of N_Port_IDs may be needed for a single physical N_Port. This is not allowed by most existing Fibre Channel switches.

SUMMARY OF THE INVENTION

Embodiments of the present invention allow for address scaling of existing addresses in a FC, FCoE, CEE or other type of network. More specifically, subaddresses can be used in conjunction with existing addresses, so that a combination of a subaddress and existing address can identify an addressable entity. Thus, multiple entities can be share a single existing address and be distinguished among each other by way of their respective subaddresses.

Some embodiments of the invention allow for use of the inventive subaddressing scheme in conjunction with devices or network elements (e.g., gateways, switches, etc.) that may not be subaddressing aware.

Further embodiments allow for the multiple distinct devices to communicate with a single Fibre Channel switching element through a single port by using N_Port_ID Virtualization.

BRIEF DESCRIPTION OF THE DRAWINGS

FIG. 1 is a diagram of an N_Port_ID.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to scaling of addresses in FC and FCoE networks. More specifically, this relates to a secondary addressing scheme which allows for multiple different entities to use a single N_Port_ID.

Although embodiments of the invention may be described and illustrated herein in terms of SAN and blade servers, embodiments encompass any network architecture which requires a larger number of addresses than available. Furthermore, while embodiments are described herein in terms of FC and FCoE networks, embodiments of the invention may include other types of networks as well. It should be noted that reference to FC standards, specifications, devices and behaviors in this document may also refer to related FCoE standards, specifications, devices and behaviors.

FIG. 1 is a diagram showing an exemplary N_Port_ID 100. The N_Port_ID is 24 bits long. It is divided into three parts— Domain_ID 101, Area_ID 102 and Port_ID 103, each of which comprising 8 bits. The Domain_ID is associated with a particular Fibre Channel switch and is the same for all devices directly connected (i.e., without intervening FC switches) to the switch. While not strictly necessitated by the Fibre Channel protocol, for many existing switches the Area_ID is associated with a single port of the Fibre Channel switch (i.e., a single F_Port). Thus, all entities connected to a single FC switch port must have the same Domain_ID and usually must have the same Area_ID. Therefore, usually only the last 8 bits of the N_Port_ID can be used to identify individual entities connected to a single F_Port. This provides for 256 possible addresses. This number is further reduced to 128 for many existing FC switches.

Traditionally, it was believed that the above number of addresses would be sufficient because most envisioned that only a single device (such as, for example, a computer) would connect to a single F_Port and the different entities that would require different addresses would be different virtual machines running at that single computer. Furthermore, it was not expected that more than a hundred virtual machines would run on a single computer.

Figure 2:
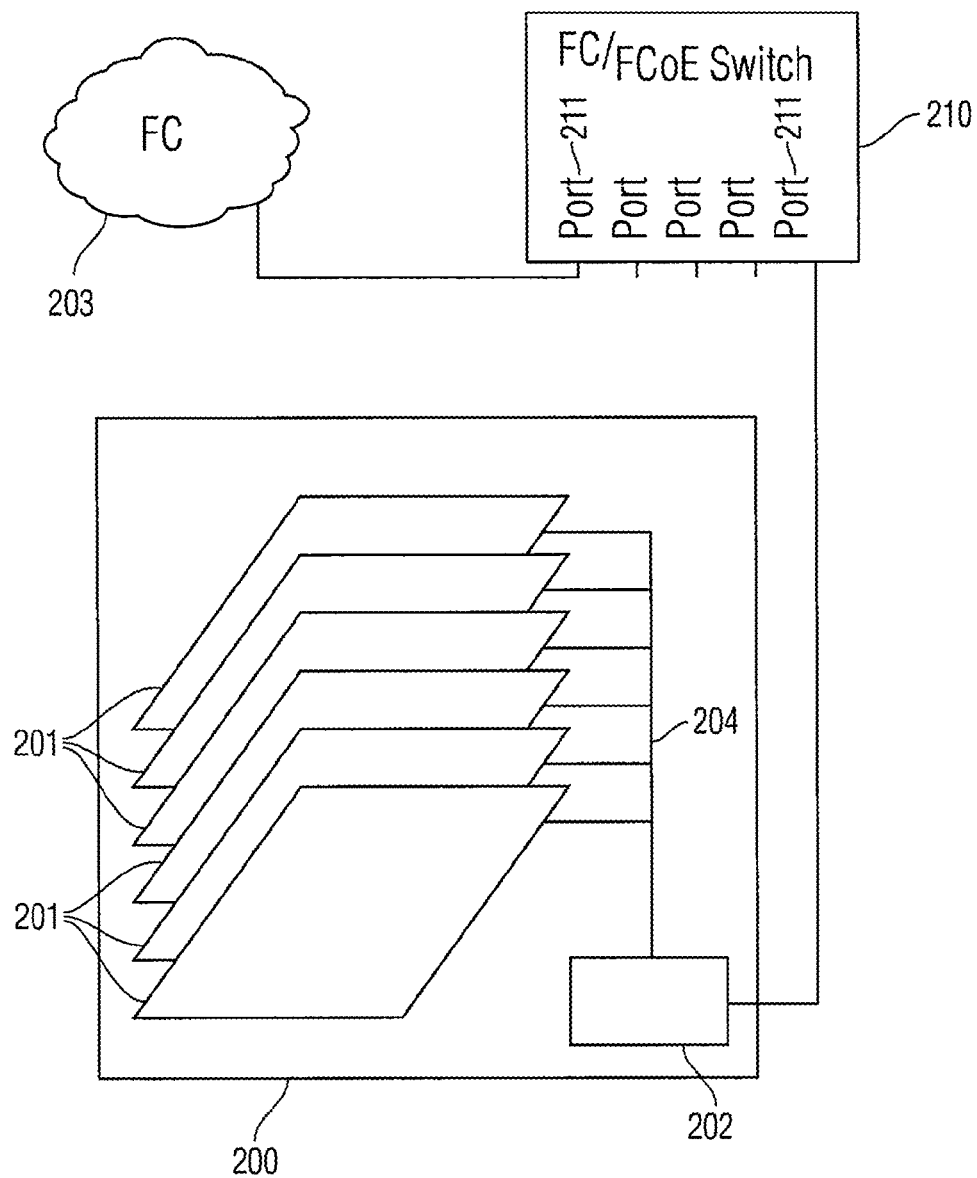
FIG. 2 is a diagram of an exemplary server system according to embodiments of the invention.

However, recent advances in server integration and parallel processing test these assumptions. Note, for example, the system of FIG. 2. FIG. 2 shows an exemplary multiple server system connected to a Fibre Channel network according to embodiments of the invention.

FIG. 2 shows a blade server enclosure 200. A "blade server" is a computer or a server designed for high density placement. For example, multiple server blades 201 can be placed within the blade server enclosure 200. While only six server blades are shown in FIG. 2, the number can be higher (e.g., 16). The server blades may need to communicate with Fibre Channel network 203. This may be accomplished through switch 210. Generally, switch 210 can be a Fibre Channel switch or an FCoE switch. However, in the present embodiment, switch 210 is a Fibre Channel switch. As shown the FC switch 210 may include multiple ports 211 212. In the present embodiments the ports are F_Ports and E_ports, defined in the ANSI T11 Standards, such F_Port 211 and E_Port 212. In some existing systems, each server blade computer 201 may be connected to a different F_Port of switch 210. However, this setup requires much wiring, and tends to complicated, expensive and prone to errors.

Thus, embodiments of the present invention provide that a large number of, or all blade servers in an enclosure can be connected to a single F_Port, such as F_Port 211. For this purpose, each of server blades 201 can be connected to element 202 through a connection 204. In some embodiments, the connection 204 can be a local bus, such as a PCI bus, or it can be a serial backplane, and the element 202 can be an FC host bus adapter (HBA), a Converged Network Adapter (CNA), a Fibre Channel switch, a Converged Enhanced Ethernet (CEE) switch, or a CEE switch with an embedded FCoE gateway. Thus, the processors of the blade servers 201 can communicate through the bus or serial link to and from the HBA, CNA, CEE switch, CEE/FCoE switch and the HBA, CNA, CEE switch, CEE/FCoE switch can send and receive these communications to and from FC switch 210 according to the Fibre Channel protocol.

According to alternative embodiments, connection 204 can be a local bus, element 202 can be an FCoE Converged Network Adapter (CNA) and switch 210 can be a Fibre Channel over Ethernet (FCoE) switch. Fibre Channel over Ethernet (FCoE) is a known protocol for wrapping or tunneling Fibre Channel communications into Ethernet communications and transmitting them over an Ethernet network. Thus, the processors of the server blades 201 can communicate through the bus to and from the CNA and the CNA can send and receive these communications to and from the FCoE switch 210 according to the FCoE protocol. In the FCoE embodiment, the ports of switch 210 are VF_Ports and VE_Ports; for example, port 211 can be a VF_Port and port 212 can be a VE_Port.

Element 202 can include a processor and a memory. The memory can store instructions for execution by the processor. These instructions can be referred to as software or firmware. The processor can perform some of the functions of embodiments of the present invention as discussed below. Furthermore, each server blade can include a processor and a memory. The memory can include instructions which can be executed by the server's processor. As discussed below, some servers may include multiple processors, each of which may execute a respective set of instructions.

In either embodiment, element 202 (whether an HBA, CNA, Fibre Channel switch, CEE switch, or a CEE/FCoE switch) communicates with a single port of the FC or FCoE switch (e.g. F_Port 211). The FC or FCoE switch can be connected to the rest of a Fibre Channel network (e.g., FC network 203) through another port (e.g., E_Port 212). Thus, the various server blades within the enclosure 200 can communicate with FC or FCoE network 203.

However, the different server blades 201 are different entities that are connected to a single port (F_Port 211). Thus, their communications should be differentiated by different addresses. This can be done according to the NPIV protocol as discussed above. Accordingly, each blade server 201 can be assigned a separate identification (i.e., separate N_Port_ID) according to the NPIV protocol.

However each server blade can include multiple independent entities. For the purposes of this application, an independent entity is an entity that usually requires a separate network address for ordinary operation. In practice, an independent entity may be, for example, an operating system (OS) image, or a virtual machine, as these entities usually require a separate network address. In some embodiments, a single computer (such as a single blade server) can be a single entity.

Thus, for example, each of server blade 201 can include multiple (e.g., two) processors. Furthermore, each of the processors can include multiple (e.g., eight) cores. Each core may in itself run multiple (e.g., 10) virtual machines. Thus, in one example, each blade server can host 160 independent entities, each requiring a unique address. If, for example, enclosure 200 includes 16 server blades, the enclosure would include 2,500 independent entities all connected to a single F_Port and requiring a unique address. As noted above, most switches can handle only 256 addresses per F_Port and many switches can handle only 128.

Therefore, the system of FIG. 2 is not possible using currently available Fibre Channel technology. Instead, if current technology is to be used, smaller groups of server blades would have to be connected to different F_Ports so that no more than a limited number of virtual machines (usually 128) are connected to any single F_Port. This would result in increased cost, because of the higher number of F_Ports, cables, elements 202 required. Furthermore, the large number of cables would make installation and management of the system more difficult and errors more likely.

Embodiments of the present invention address this limitation by providing for a larger address space while using the same number of N_Port_IDs available per F_Port. This is accomplished by utilizing a subaddress in addition to the existing N_Port_ID which can differentiate two or more entities having the same N_Port_ID.

Figure 3:
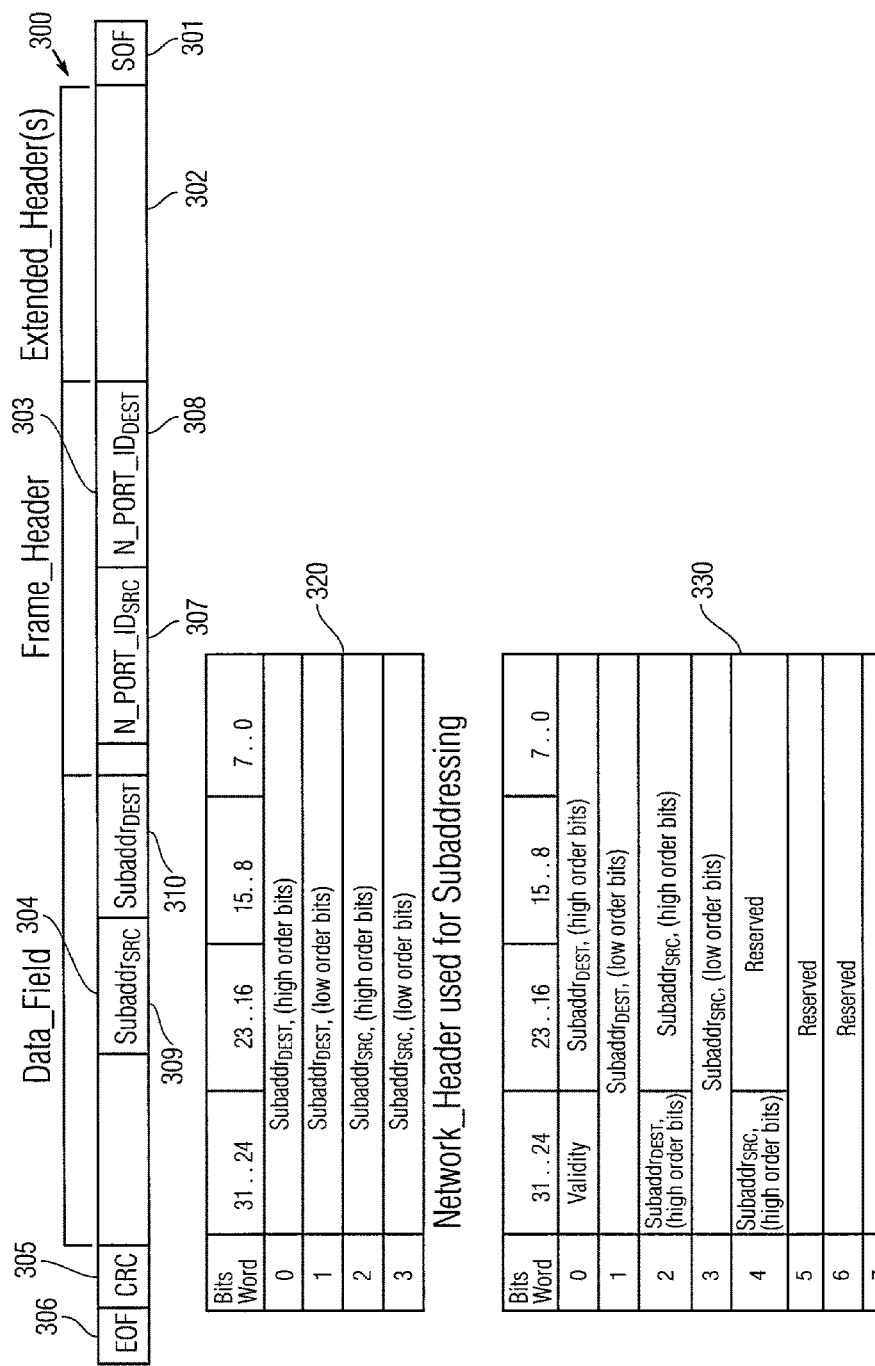
FIG. 3 is a diagram showing exemplary placement of the subaddress fields within a Fibre Channel frame according to embodiments of the invention.

In some embodiments the subaddress can be stored in the optional headers of a Fibre Channel frame. FIG. 3 is a diagram showing the use of optional headers for subaddressing. A Fibre Channel frame 300 is shown. Frame 300 begins from the right and ends at the left side of the figure. The frame includes a start of frame (SOF) field 301, an extended header field 302, a frame header field 303, a data field 304, a cyclic redundancy check (CRC) field 305 and an end of frame field 306. These fields are known and discussed in the Fibre Channel standards. The frame header field can include the N_Port_IDs for the source (field 307) and the destination (field 308).

Optional headers are stored in the data field. While this is an exception from the usual rule that the data field stores payload data and the header field(s) store all headers, it is a well known exception and is disclosed by the FC standards. Thus, the data field 304 may store a source subaddress 309 and a destination subaddress 310. Subaddresses 309 and 310 together form a network header or an association header within the data field 304.

FIG. 3 also shows two exemplary headers which may hold the source and destination subaddresses. Network header 320 and association header 330 are shown. As shown, the headers may include a plurality of 32 bit words, and the subaddresses may encompass two words each. Thus, the source and the destination subaddresses may be 64 bit values that may be stored in two or more 32 bit words. Other embodiments may feature different source and destination subaddresses.

An N_Port_ID address may be combined with a subaddress to provide a unique address of a device on a network. Thus, the source of frame 300 can be uniquely identified by the combination of source N_Port_ID address 307 and source subaddress 309. Similarly, the destination can be uniquely identified by the combination of destination N_Port_ID address 308 and destination subaddress 310.

Figure 4:
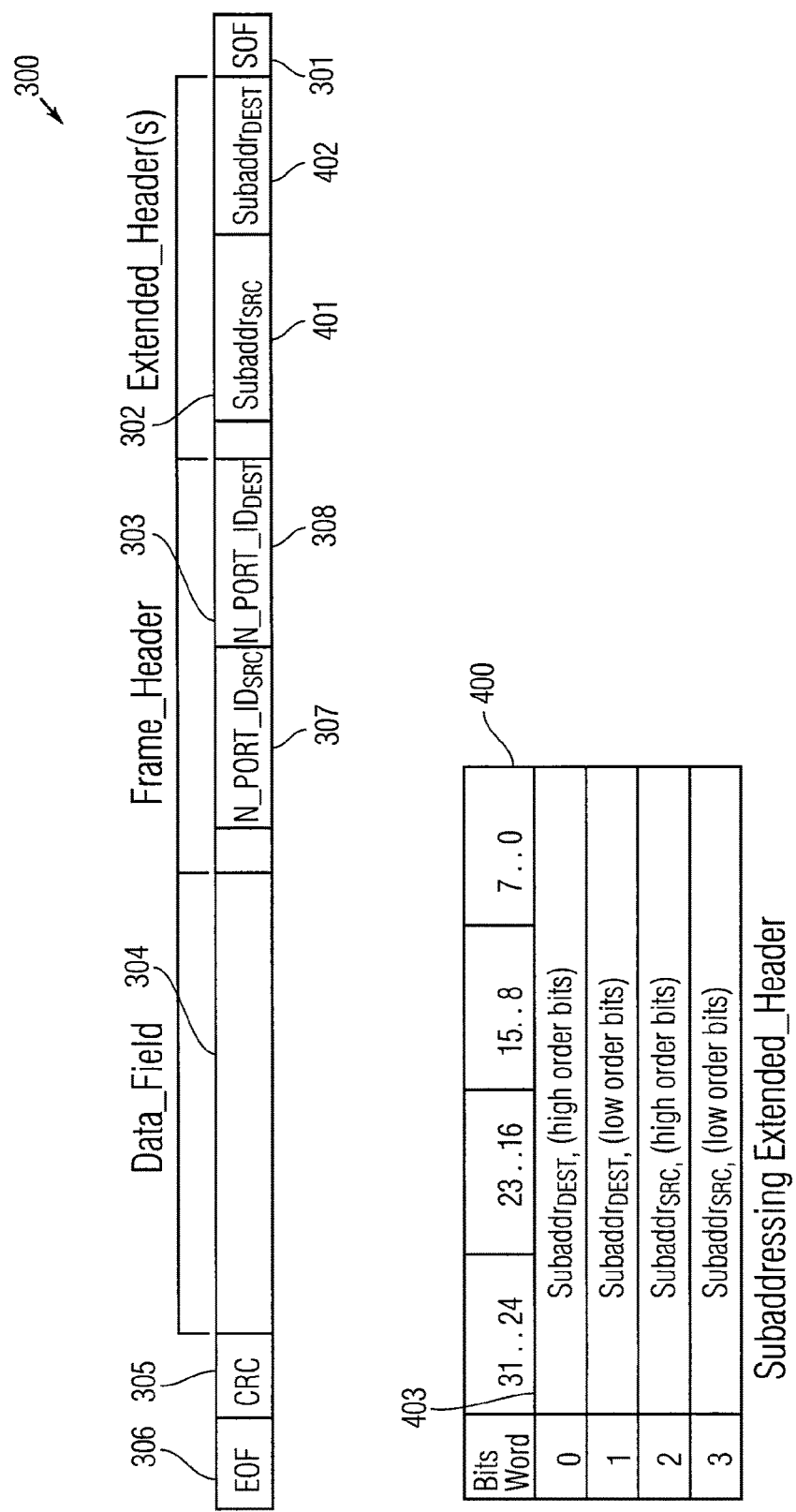
FIG. 4 is another diagram showing exemplary placement of the subaddress fields within a Fibre Channel frame according to embodiments of the invention.

FIG. 4 shows another option of storing the extended addresses. FIG. 4 shows a fibre channel frame similar to that shown in FIG. 3. However, according to the embodiments shown in FIG. 4, extended addresses 401 and 402 can be stored by extended headers field 302. The extended header field 302 is a field defined by the FC protocol and used to hold additional header information when necessary.

Table 400 shows an exemplary extended header field 302. The R_CTL or routing control field 403 indicates what type of extended header may be stored in the extended header field 302. In embodiments of the invention a specific R_CTL value is defined to indicate that the extended header field stores subaddress data. This value is stored in the R_CTL field 403.

Figure 5:
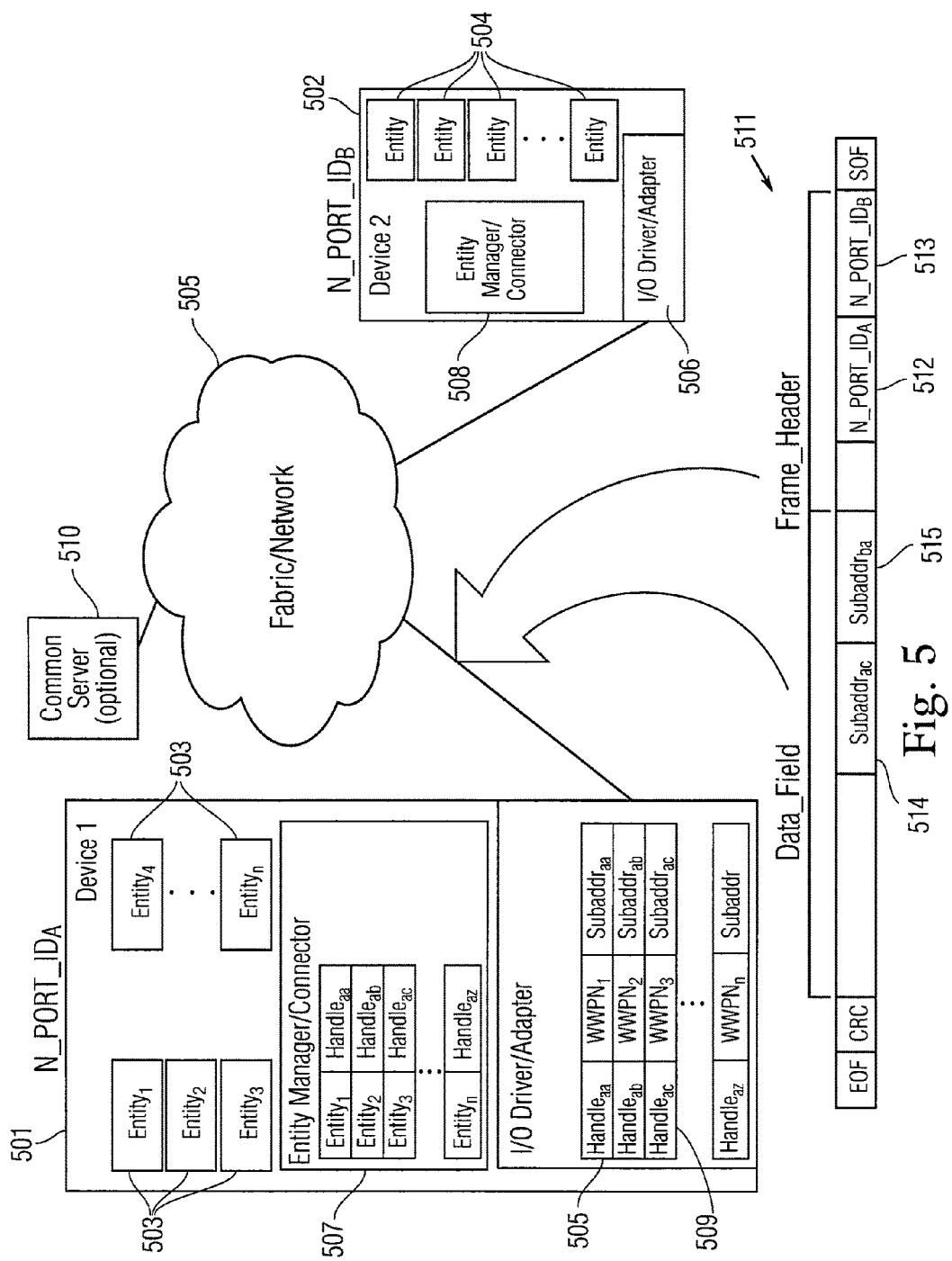
FIG. 5 is a diagram showing an exemplary networked system that utilizes subaddresses according to embodiments of the invention.

FIG. 5 is a diagram of a networked system that utilizes subaddresses. The network system may include several devices, such as devices 1 and 2 (501 and 502). Each device can include one or more entities, such as entities 503 for device 501 and entities 504 for device 502. The entities can be computing entities that would ordinarily require a separate N_Port_ID. Thus, for example, if the devices are computers, the entities can be different OS instances running on the same computer through a hypervisor or the like. Alternatively, the devices can be multiple-server enclosures, and the entities can be individual servers within the multiple server enclosures, such as server blades. If the entities are server blades they can share a single I/O adapter per enclosure and connect to it through a bus.

Fabric/Network 505 can be a Fibre Channel fabric or a CEE network. Each device can include an I/O adapter or driver (505 for device 1 and 506 for device 2). The I/O adapter can be a Fibre Channel host bus adapter (HBA), a FCoE CNA, or a Fibre Channel or FCoE driver that runs on the processor or a processor of its respective device. The I/O adapter can include its own processor and memory. The processor can execute instructions stored at the memory. Each device can also include an entity manager or connector (507 for device 1 and 508 for device 2). The entity manager/connector can be an element that manages the communications between the entities and the I/O driver/adapter. If the device is a single computer, and the entities are various OS instances running on the computer, then the entity manager/connector can be an entity manager, or more specifically, a hypervisor or a similar element that manages input/output for the multiple OS instances. If the device is a multi computer enclosure, the entity manager/connector can be a bus that connects the multiple computers (entities) to the I/O adapter (in that case the I/O driver/adapter would more likely be an adapter and not a driver). The entity manager can also be offloaded or located on the I/O adapter.

In the ordinary prior art network Entities 503 and 504 would request and obtain individual N_Port_IDs through their respective I/O drivers/adapters by the use of the NPIV protocol. However, as noted above, a large number of entities can actually use up all the available N_Port_IDs. Therefore, according to embodiments of the invention, the entities can use subaddressing to expand the number of available addresses. In some embodiments, the multiple entities do not obtain individual N_Port_IDs. Instead, each device (501 and 502) obtains from the fabric/network 505 a single N_Port_ID associated with that device. Thus, for example, device 501 can obtain N_Port_ID$_A$ as its number and device 2 can obtain N_Port_ID$_B$. All entities within the device use the same N_Port_IDs and are differentiated on the network by the use of subaddressing.

Referring to device 501, the entity manager/connector 507 can assign each entity a handle. The handles can be OS image identifiers assigned by a hypervisor, or bus addresses assigned by a bus controller (the bus addresses can also be assigned by the entities themselves by arbitration). Thus, for example, Entity$_1$ receives Handle$_{aa}$, Entity$_2$ receives Handle$_{ab}$, etc. The entity manager/connector can also forward communications between the various entities and the I/O driver/adapter.

The I/O driver/adapter can assign to each entity a world wide port number (WWPN) and a subaddress. Thus, the driver/adapter can associate the handle of each entity with its respective WWPN and subaddress as shown in table 509. The WWPN numbers are static numbers that are intended to be universally unique, or at least relatively so. These numbers are defined by relevant FC standards and can be assigned by the I/O driver/adapter in the usual manner. The subaddresses are intended to identify each entity within a device. The subaddresses need only be unique within each individual device. Thus, the I/O driver/adapter 505 can assign the subaddresses to the various entities, ensuring that each entity within the device 501 receives a subaddress that is unique within the device. Thus, for example, Entity$_1$, whose handle is Handle$_{aa}$ can receive WWPN$_1$ as a WWPN number and Subaddr$_{aa}$ as a subaddress, as shown in table 509.

In order for the entities 503 within device 501 to communicate with entities 504 within device 502 as well as other entities in other devices they should have the subaddresses and device addresses of these other entities. I/O driver/adapter 505 and/or any entity within device 501 can obtain the N_Port_ID of device 502 and any other devices that may be connected to network 505 in the usual manner defined in the FC (or FCoE) specifications. More specifically, this can be accomplished by communicating in accordance with known discovery protocols with FC switches or FCoE components within the network 505. However, the known FC and FCoE discovery protocols do not provide for discovery of subaddresses. In some embodiments, the fabric/network 505 can be modified to provide for the discovery of subaddresses as part of the usual FC and FCoE discovery process.

However, other embodiments, may allow subaddresses to be used without modifications to the fabric/network 505, or with minor modifications that do not necessarily include modifications to the discovery protocol. In these embodiments, there may be two methods a device may use to discover the subaddresses of the other devices on the network.

According to the first method, the device (such as device 501) can merely communicate with the other device to discover the subaddresses. The I/O driver/adapter 505 of device 501 can discover the N_Port_ID of device 502 (or any other devices on the network) through existing FC or FCoE discovery protocols. Subsequently, driver/adapter 505 can request from device 502 information about the subaddresses of device 502. This can be achieved by sending communications according to a predefined protocol. These communications need not include any subaddress information. The I/O driver/adapter 506 of device 502 can send the subaddresses and other optional information (such as, for example, WWPNs of its entities) to device 501. The I/O driver/adapter 501, upon receiving this information can make it available to the entities 503 in device 501. This will allow individual entities 503 of device 501 to communicate with individual entities 504 of device 502. Device 501 may discover in a similar manner entities in other devices on the network. Also, other devices on the network may discover the subaddresses of entities 503 of device 501 in a similar manner.

Another option for subaddress discovery is the use of common server 510. Each device can provide a list of the subaddresses of its entities as well as other optional information (such as, for example, WWPNs) to the common server. The common server can store these lists and provide them to other devices that request them. Thus, each device on the network can obtain a list of the subaddresses of entities of other devices on the network. The common server may be configured to limit access to the subaddresses of devices based on zoning, if applicable.

Once the I/O driver/adapter has discovered the subaddresses of the entities of another device (such as device 502) it can make them available to its local entities (i.e., entities 503. This will allow entities 503 to communicate with entities 504. Frame 511 is an exemplary FC frame that can be sent by an entity within device 501 (in this example, Entity$_3$) and an entity within device 502. The FC frame includes the source and destination N_Port_IDs as well as the source and destination subaddresses. The source and destination N_Port_IDs are the N_Port_IDs of the devices the source and destination entities are a part of. Thus, the source N_Port_ID 512 is N_Port_ID$_A$, and the destination one is N_Port_ID$_B$. The source subaddress 514 is subaddr$_{ac}$ (the subaddress associated with Entity$_3$) and the destination subaddress 515 is subaddr$_{ba}$ which is associated with one of the entities 504 in device 502. Thus, an N_Port_ID in combination with its respective subaddress can serve as a unique identification of an entity within a device, negating the need to use individual N_Port_IDs for all devices.

Some embodiments discussed in FIG. 5 may operate with a standard FC or CEE/FCoE fabric/network 505. That is, the various switches and other elements of the network need not be aware of subaddressing. Other embodiments may require modifications to the network 505 to allow for fabric based subaddress discovery and/or to allow for fabric based subaddress remote state change notifications (RSCN) or subaddress based frame routing. However, the embodiments of FIG. 5 feature subaddressing aware devices. More specifically, both the entities and the I/O drivers/adapters are configured to utilize subaddresses.

Some embodiments provide for the use of existing devices (i.e., devices unaware of subaddressing) in a network and yet still obtain the benefits of subaddressing. For example, with reference to FIG. 6, legacy devices 601 and 602 are legacy devices that do not feature the subaddressing functionality of Devices 501 and 502 of FIG. 5 or any subaddressing functionality at all. Devices 603 and 604 are subaddressing devices that do feature subaddressing functionality. These devices are connected to CEE/FCoE network or FC fabric 605 which may be similar or the same as fabric/network 505.

Figure 6:
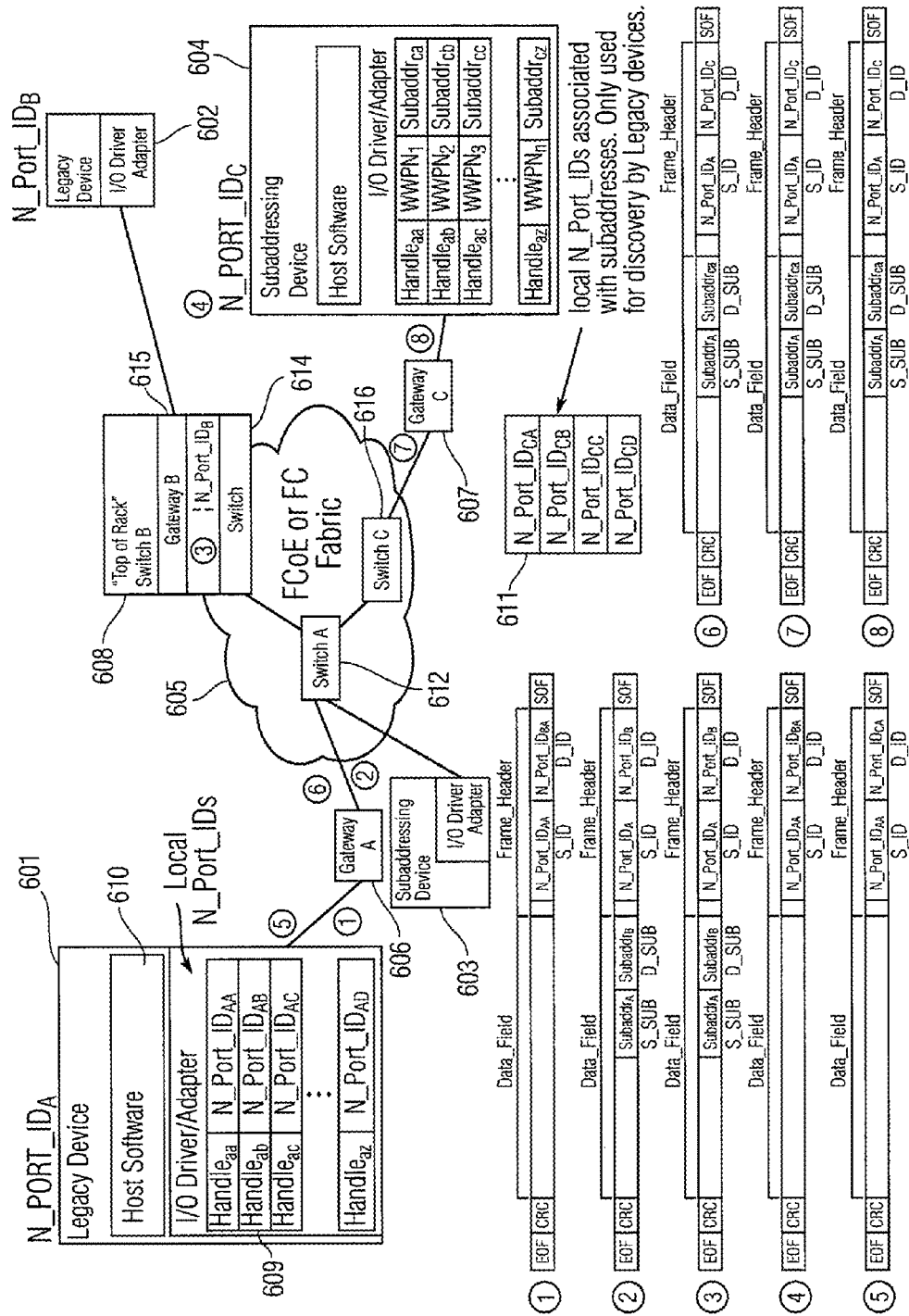
FIG. 6 is a diagram showing an exemplary networked system that utilizes subaddresses and uses legacy devices according to embodiments of the invention.

Subaddressing gateways can be used to connect devices that do not feature subaddressing to the network. Thus, the subaddressing gateways can be used to add the subaddressing functionality. In FIG. 6, gateways 606, 607 are subaddressing gateways. Furthermore, gateway/switch combination 608 includes a subaddressing gateway 615. Subaddressing gateways are usually connected to legacy devices that are not capable of subaddressing (see subaddressing gateways 606 and 615). However, this need not always be the case and some subaddressing gateways can be connected to subaddressing capable devices (such as gateway 607).

Since legacy devices and entities within them cannot handle subaddressing, entities within these devices can use N_Port_IDs for addressing of their communications. However, for the reasons discussed above, there may be a shortage of N_Port_IDs. Thus, according to some embodiments, the entire space of available N_Port_IDs can be separated into global (or fabric) IDs and local IDs. Global IDs can be unique and can be used by subaddressing capable devices. Local IDs can actually be repeated on the network and can be for addressing by legacy devices.

Some embodiments provide for specific rules as to how local IDs can be repeated. In general, the purpose of the rules can be to ensure that while local IDs can be repeated on the network in general, any possible network communication between any two legacy devices does not include redundant local IDs. Thus, repeating of local IDs may be performed only for devices that are not expected to communicate with each other.

Figure 7:
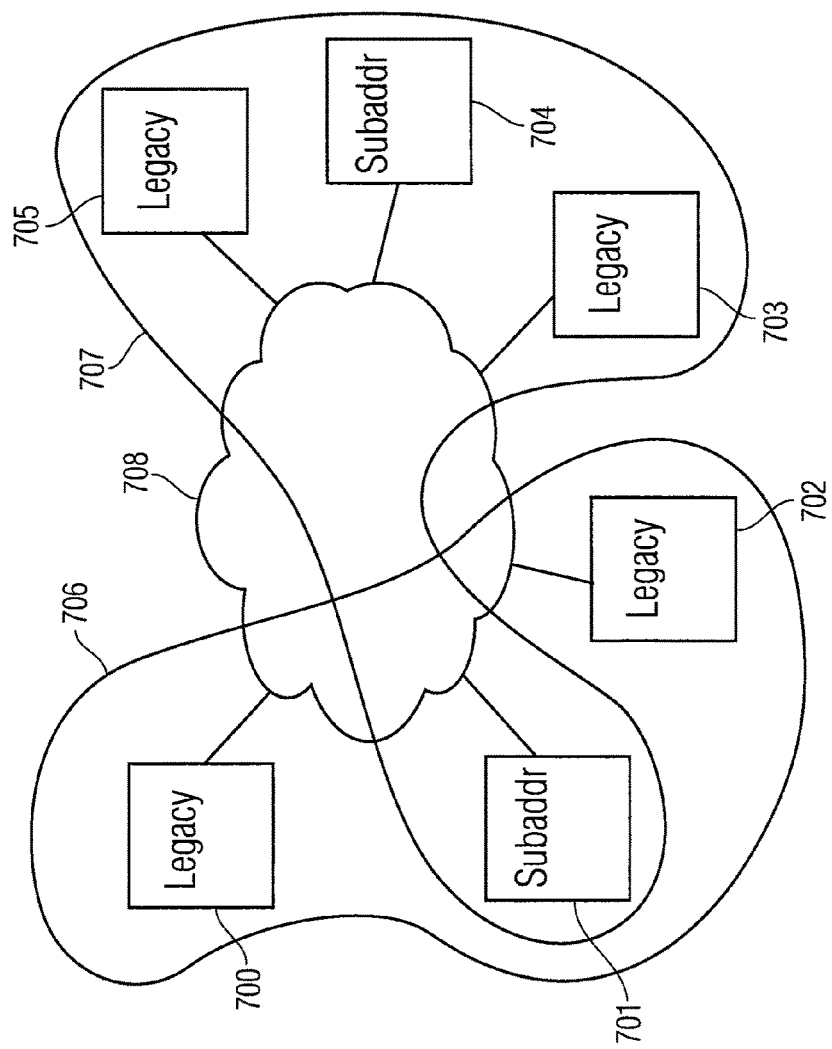
FIG. 7 is a diagram showing an exemplary network and illustrating the use of global and local IDs according to some embodiments of the invention.

FIG. 7 shows an exemplary scheme for determining which local IDs are to be repeated. Network 708 can be a Fibre Channel or an CEE/FCoE network similar to network 605. Devices 700-705 are connected to it. Devices 700, 702, 703 and 705 can be legacy devices that are not subaddressing capable, while devices 701 and 704 can be subaddressing capable devices. Groups 706 and 707 are groups of devices that are expected to communicate among each other. Thus, each device is expected to communicate only with devices that are within a group it belongs to. Thus, devices 700, 701 and 702 are in group 706, while devices 701, 703, 704, 705 are in group 706. The groups are such that only subaddressing capable devices can belong in two groups. In other words, the groups are mutually exclusive with respect to legacy devices. If, for example, device 702 communicates with devices of both groups, then the two groups will not be valid, as device 702 cannot be a member of both groups. Thus, in this case, the two groups may need to be combined into a single group. However, device 701 can be a member of both groups because it is a subaddressing capable device.

Redundant local N_Port_IDs can be assigned for devices (or entities thereof) of different groups. Thus, an entity of device 700 may be assigned the same local ID as an entity of device 705. However, the local IDs within each group should be unique.

Entities within subaddressing capable devices may also be assigned local IDs for the purposes of communication with legacy devices. These local IDs should also be unique within the group(s) the subaddressing capable devices are a part of. If a subaddressing capable device is part of two or more groups, its local IDs can be unique in all such groups or, alternatively, it can have two or more sets of local IDs associated with respective groups.

Separation of devices into groups can be done based on zoning. Alternatively, or in addition, separation can be done independent of zoning and based on knowledge of the behavior of particular devices on a network.

FIG. 6 shows the communication between two legacy devices or a legacy device and a subaddressing capable device in more detail. Legacy device 601 can include a plurality of entities and a table 609 storing handles and respective N_Port_IDs of all entities included therein. The N_Port_IDs in the table are local N_Port_IDs (i.e., they do not need to be unique across the entire network).

The host software 610 of the legacy device 601 can be aware of all local N_Port_IDs of entities in other devices device 610 is expected to communicate with. The host software 610 may discover these N_Port_IDs by using standard FC fabric discovery procedures. The host software may similarly discover a plurality of N_Port_IDs associated with entities that are part of subaddressing capable devices. For example, the entities of subaddressing capable device 604 may be associated with a plurality of local N_Port_IDs 611, so that each local N_Port_ID of IDs 611 is associated with a respective entity. While the entities of device 604 can use their subaddresses to communicate with other subaddressing based devices, the local N_Port_IDs can be used to communicate with legacy devices.

While the entities of various devices are associated with local N_Port_IDs, the actual devices can be each associated with a single global N_Port_ID. Thus, device 601 is associated with N_Port_ID$_A$, device 602 with N_Port_ID$_B$ and device 604 with N_Port_ID$_C$(N_Port_ID$_A$, N_Port_ID$_B$ and N_Port_ID$_C$ being global N_Port_IDs).

FIG. 6 shows the process of communication of legacy device 601 with other devices and the associated FC frames. The FC frames are labeled by single digit reference numbers (the same reference numbers are used to signify the connections across which these FC frames are sent). It should be noted that while FC frames are being shown, an FCoE embodiment of the present invention can operate with corresponding FCoE frames.

Initially, the device 601 sends a message to device 602. The message can include frame 1. The message can be sent by an entity within device 601 that is associated with the local N_Port_ID labeled as N_Port_ID$_{AA}$. The message may be directed to an entity within device 602 that is associated with local N_Port_ID$_{BA}$. Initially, the entity of device 601, being unaware that a subaddressing scheme is in use, can send a standard FC frame that includes the local N_Port_IDs of the sender and the recipient. This is frame 1. The S_ID and D_ID fields can indicate source and destination IDs, respectively. Thus, the source ID of frame 1 is N_Port_ID$_{AA}$ and the destination ID is N_Port_ID$_{BA}$.

However, frame 1 cannot be sent over the network, because N_Port_ID$_{AA}$ and N_Port_ID$_{BA}$ are local IDs which means they are not guaranteed to be unique on the network. Thus, frame 1 is initially sent to subaddressing gateway 606. The subaddressing gateway 606 is intended to translate frames that are based on local N_Port_IDs (such as frame 1) to frames that are based on global N_Port_IDs and subaddresses and vice versa.

Each entity within a legacy device can also be assigned a subaddress. The entities or the legacy devices are not aware of this subaddress, as they are not subaddressing capable. Nevertheless, the address can be assigned by the network, subaddressing gateway or by a server such as common server 510 of FIG. 5 and be accessed by the various subaddressing gateways. Furthermore, the subaddressing gateways may be aware of mapping between subaddresses and local N_Port_IDs.

When subaddressing gateway 606 receives frame 1, it examines its source and destination IDs, and converts each into a respective pair of a global N_Port_ID and a subaddress. The global N_Port_ID is the ID of the device associated with the local N_Port_ID. The subaddress can be the subaddress of the entity associated with the device.

Thus, for frame 1, subaddressing gateway 606 converts the source local ID N_Port_ID$_{AA}$ into a global ID associated with the source device (N_Port_ID$_A$) and a subaddress associated with the entity that sent the frame (i.e., the entity associated with local ID N_Port_ID$_{AA}$). This subaddress is Subaddr$_A$. The subaddressing gateway constructs frame 2 and places within it the global ID of the source device as the source N_Port_ID, and the subaddress of the source entity as the source subaddress S_SUB.

Similarly, the subaddressing gateway 606 converts the destination local ID N_Port_ID$_{BA}$ to a destination global ID N_Port_ID$_B$ and a destination subaddress Subaddr$_B$. The subaddressing gateway then places the destination ID and subaddress in the D_ID and D_SUB fields of frame 2. The subaddressing gateway can keep the data of the data field of frame 1 in the data field of frame 2.

It is noted that the local IDs need not be unique on the network. Thus, a single local ID can be associated with one or more pairs of global ID and subaddress. However, subaddressing gateway 606 can discover the correct association based on the context. For example, subaddressing gateway 606 may be aware which device(s) it is directly connected to, and these devices can be prohibited from sharing local IDs. Thus, subaddressing gateway 606 can correctly associate incoming source local IDs with their respective global IDs and subaddresses. Furthermore, the subaddressing gateway 606 may be aware of a limited number of devices that the device(s) directly connected to it is allowed or expected to communicate with. In other words, subaddressing gateway 606 may be aware of which group device 601 belongs to (see FIG. 7 and associated discussion for more detailed discussion of groups). As discussed above, local IDs can be unique within individual groups. Thus, subaddressing gateway 606 can determine the correct correlation between a destination local ID and its respective pair of a global ID and subaddress based on the group device 601 belongs to.

Subaddressing gateway 606 can then send frame 2 across the network. Switch 612 and various other switches on the network (if present) will route frame 2 according to global N_Port_ID stored in its D_ID destination field (i.e., N_Port_ID$_B$). Again, N_Port_ID$_B$ is unique on the network, so the switches need not be aware of groups or subaddressing but may be ordinary FC or FCoE switches. Eventually, frame 2 can reach switch subaddressing gateway combination 608. This combination can also be referred to as a top of rack switch. As indicated, top of rack switch can be a combination of switch 614 and subaddressing gateway 615.

Switch 614 can determine based on the D_ID field that frame 2 is addressed to the local device 602 and forward frame 2 to the subaddressing gateway as frame 3. (Frame 3 is identical to frame 2).

Since device 602 is a legacy device, subaddressing gateway 615 must convert subaddress based frame 3 into a local address based frame that can be processed by device 602. For this purpose, the subaddressing gateway can replace the pair of global source ID (N_Port_ID$_A$) and source subaddress (Subaddr$_A$) into the associated local source ID (N_Port_ID$_{AA}$). Furthermore, the subaddressing gateway can replace the pair of global destination ID (N_Port_ID$_B$) and destination subaddress (Subaddr$_B$) into the associated local source ID (N_Port_ID$_{BA}$). This results in frame 4. The subaddressing gateway can send frame 4 to the destination entity of device 602 that is associated with local N_Port_ID$_{BA}$.

Thus, a frame can be sent between two legacy devices that do not support subaddressing. Scaling of IDs can be achieved because other devices on the network may share the same local N_Port_IDs as devices 601 and 602 as long as they are not expected to communicate over the network.

Frames 5-8 show the communication between legacy device 601 and subaddressing capable device 604. Initially, device 601 sends frame 5 that includes local IDs in the destination and source ID fields. The ID in the source ID field is the local ID of the entity sending the frame. The destination ID is a local ID associated with an entity within device 604 to which the frame is being sent. The destination ID can be one of local IDs 611 associated with the entities of device 604. In the present example, the destination ID is N_Port_ID$_{CA}$. Subaddressing gateway 606 replaces the destination and source local IDs with respective pairs of global ID and a subaddress. Thus, the source ID N_Port_ID$_{AA}$, is replaced with global ID N_Port_ID$_A$ and subaddress Subaddr$_A$, and the destination ID N_Port_ID$_{CA}$, is replaced with global ID N_Port_ID$_C$ and subaddress Subaddr$_{ca}$. Thus, subaddressing gateway 606 obtains frame 6 from frame 5. Again, the data of frame 5 is copied into the data field of frame 6. Frame 6 is sent through the network to switch 616 based on the destination global address. Switch 616 forwards frame 7, which is identical to frame 6, to subaddressing gateway 607. Subaddressing gateway 607 forwards frame 8, which is identical to frame 7, to the destination entity of device 604. Subaddressing gateway 607 does not need to change frame 7, because device 604 is subaddressing capable and can therefore process frames that include subaddresses. Thus, subaddressing gateway 607 can be used to provide discovery services and the like. For example, subaddressing gateway 607 can assign the local IDs 611 to the entities of device 604 and alert other subaddressing gateways of the assigned local IDs and respective entities.

In some embodiments, subaddressing capable devices need not be connected to the network through a subaddressing gateway. For example, subaddressing device 603 can be directly connected to a switch within the network. In this case other network elements (such as subaddressing gateways 612 and 616 or a common server such as common server 510) can assign the local IDs for the entities of device 603.

Referring back to FIG. 2, in some embodiments, connection 204 can be a Fibre Channel or FCoE/Ethernet network and element 202 can be a subaddressing gateway. Thus, the blade servers 201 can send Fibre Channel or FCoE/Ethernet frames without subaddresses to the subaddressing gateway. The subaddressing gateway can add subaddresses to frames it receives from the blade servers and send them to the FC switch 210. Additionally, the subaddressing gateway can receive subaddressed frames, remove the subaddresses from the frames, and send them to the blade servers 201. Thus, the various blade servers 201 using legacy (non-subaddress capable) adapters can communicate with subaddress capable adapters.

As discussed above, various embodiments of the invention can utilize subaddressing aware devices and/or legacy devices that are not aware of subaddressing. Furthermore, these devices can be connected to subaddressing gateways or switches (such as subaddressing gateways 606, 607 and 608 of FIG. 6). Alternatively some of the devices can be connected to legacy network elements (e.g., switches) that may not be aware of subaddressing. This may be the case, for example, for some embodiments of FIG. 5.

Usually a subaddressing gateway or switch that includes subaddressing capabilities is required for a legacy device that is not aware of subaddressing. Subaddressing aware devices can operate with a subaddressing gateway/switch or one that is not subaddressing aware.

Figure 8:
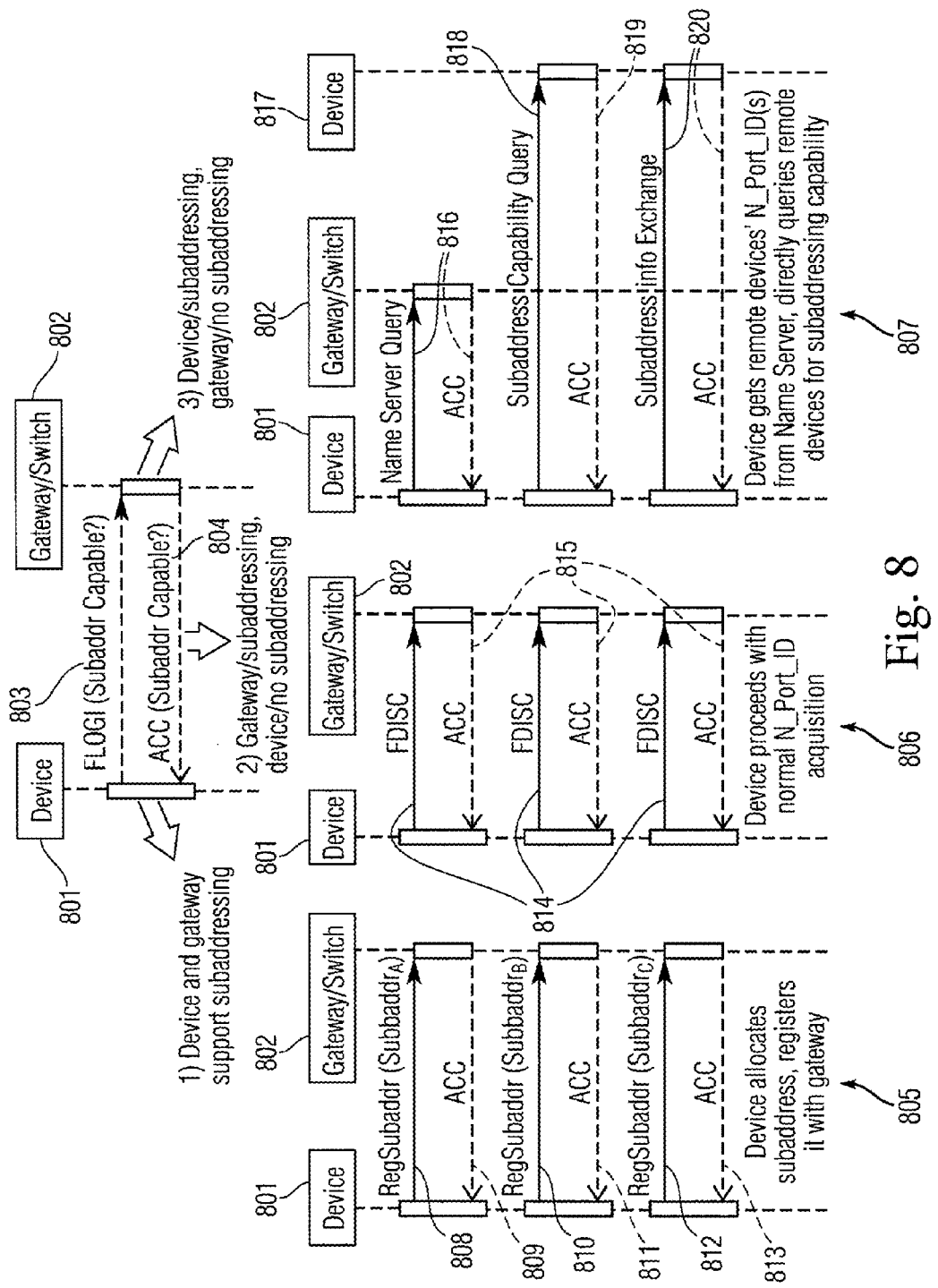
FIG. 8 is a ladder diagram showing the process of initializing a device according to some embodiments of the invention.

FIG. 8 is a ladder diagram showing various combinations of devices and gateways/switches and the initialization steps for different configurations. A device 801 can be connected to a gateway, switch or a combination thereof 802. Initially, the device can send a fabric login (FLOGI) request 803. The FLOGI request can include a field that indicates whether the device is subaddressing capable. The gateway/switch can respond with an accept message 804. The accept message 804 may include a field that indicates whether the gateway/switch is subaddressing capable. The accept message also includes an N_Port_ID. This can be considered the global N_Port_ID associated with the device, as distinguished from other N_Port_IDs that may be associated with certain entities within the device.

After the initial FLOGI and accept exchange, the ladder diagram of FIG. 8 splits into three columns, each column representing a different possible combination of the types of the device and the gateways/switch. Column 805 represents the possibility that both the device and the gateway are subaddressing capable. In this case, both the device and the gateway/switch will be aware that the other is capable of subaddressing by way of the presence of predefined flags in communications 803 and 804.

Once it is known that both the device and the gateway/switch support subaddressing, various entities within the device can directly request/register subaddresses with the gateway/switch. Thus, a first entity can register a first subaddress (Subaddr$_A$), by issuing an appropriate RegSubaddr message 808. The RegSubaddr message is not part of the current FC or FCoE standards, but can be part of an extension of the FC standard that may be used among subaddressing capable devices. It is a command to register a subaddress with a gateway (or switch). The RegSubaddr command can also include additional information such as the handle associated with the sub address or other information about the entity associated with the subaddress. The gateway/switch can send an accept message 809 to indicate that the subaddress has been registered. Thus, the first entity is registered. Other entities can similarly register their respective subaddresses (see steps 810-813). Naturally, entities can be configured to request a unique subaddress during registration (more specifically, the entities request a subaddress that is unique for the device 801. The gateway/switch may issue an error message if a subaddress is already taken.

Once a subaddress is registered, the gateway/switch 802 can alert other gateways, switches, devices or similar elements on the network of the registered subaddress. Similarly other gateways or switches may provide registered subaddresses to gateway switch 802, and may allow device 801 to perform discovery of registered subaddresses on the network by communicating with gateway switch 802. Alternatively, new subaddresses can be obtained by gateway switch 802 from other gateways and/or switches after a command for discovery has been received from the device 801. In yet another alternative, each gateway/switch can register discovered subaddresses with a central server, such as the common server 510 of FIG. 5.

Column 806 represents the possibility that the device 801 is a legacy device that is not aware of subaddressing, but the gateway/switch 802 is subaddressing capable. This case is also discussed in connection to FIG. 6 above. In this case, various entities in the device operate according to the standard FC protocol without taking advantage of subaddressing. Thus, after the initial FLOGI is successfully completed (steps 803 and 804), each additional entity requests an N_Port_ID by consecutively sending an FDISC command (commands 814). The gateway/switch responds to these commands by sending an accept message that includes a respective N_Port_ID for each entity (commands 815). These N_Port_IDs are local N_Port_IDs and need not be unique over the entire network. However, they may be unique for device 801 and any other devices device 801 is expected to communicate with. The gateway/switch may also obtain subaddresses and associate the subaddresses with the various local N_Port_IDs it assigned to the entities of device 801 during steps 815. The gateway/switch can provide these subaddresses to other gateways/switches on the network and/or to a common server to allow for subaddress discovery.

During ordinary operation, the device 801 and gateway/switch 802 may operate in a manner similar to that discussed above in connection with FIG. 6. In other words, entities within device 801 can send and receive frames based on local N_Port_IDs and the gateway/switch can replace the local N_Port_IDs with pairs including a global N_Port_ID associated with the device 801 and a particular subaddress associated with a respective entity within the device 801.

Column 807 represents the eventuality in which the device is capable of subaddressing but the gateway/switch is not. At step 816, device 801 performs a name server query for other devices that may be on the network. The gateway/switch may act as a name server and respond to the query or it may forward the query to a separate name server. Providing name server services is a standard feature of many existing FC switches, thus, the gateway/switch 802 need not be subaddressing enabled to perform the name server query. Device 801 may receive an accept response with the address of at least another device in the network, such as device 817. Device 801 can then query device 817 to determine whether it supports subaddressing (step 818). Device 817 can answer in an accept message 819. If device 817 does in fact support subaddressing, device 801 and device 817 can further communicate to discover each other's entities' subaddresses (step 820). Each device may have previously locally assigned subaddresses to its entities. These subaddresses may be communicated between the two devices during step 820. After each of devices 801 and 817 is aware of the subaddresses of the other device's entities, entities of either device can directly communicate with entities of the other by utilizing subaddressing.

Device 801 can repeat steps 818, 819 and 820 for other devices that may have been discovered on the network during step 816 in order to discover the entity subaddresses of those devices as well.

In an alternative to column 807, device 801 can instead contact a predefined server, such as common server 510 of FIG. 5, in order to obtain the subaddresses associated with various entities of other devices on the network. Furthermore, device 801 can register with the common server its own global N_Port_ID and the subaddresses of its entities, so that these can be discovered by other devices.

While the above embodiments are described in reference to Fibre Channel, a person of skill in the art would recognize that they are also applicable for Fibre Channel over Ethernet (FCoE) networks and other similar types of networks that may benefit from address scaling.

Figure 9:
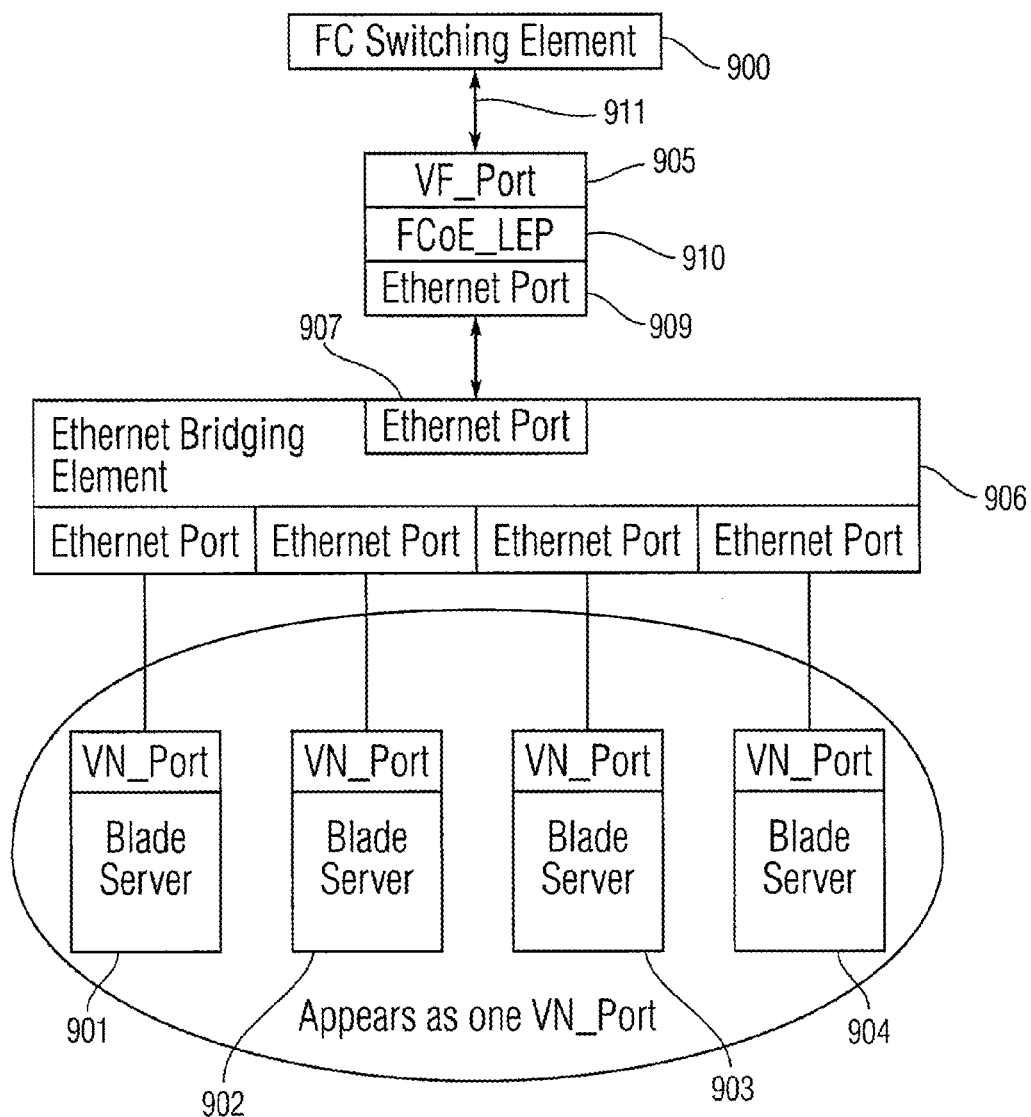
FIG. 9 is a diagram showing multiple FCoE devices utilizing a single VF_Port according to some embodiments of the invention.

FIG. 9 shows another embodiment of the invention. The embodiment of FIG. 9 allows for multiple FCoE based computers, such as blade servers 901-904 to connect to an FC switching element 900 through a single port 905. Usually a Fibre Channel switch port, or an F_Port, can only connect to a single Fibre Channel device port (N_Port).

In Fibre Channel over Ethernet networks, the switch port is referred to as a VF_Port and the device port as a VN_Port. Since the FCoE protocol is based on the FC protocol, the requirement that a single VF_Port can only connect to a single VN_Port is present in FCoE as well. However, this may require that various FC switches provide a separate port for each device that is connected to them. This may be relatively costly.

Embodiments of the present invention resolve the above by providing for the connection of multiple FCoE enabled devices to a single FCoE switch port. Multiple devices, such as blade servers 901-904 can be connected to an Ethernet bridge 906. The blade servers connect to the bridge by connecting VN_Ports of the blade servers with respective Ethernet ports of the bridge. The bridge can be a simple Ethernet hub, or an Ethernet switch. The bridge need not have any specific FCoE functionality.

The bridge allows the servers 901-904 to communicate with VF_Port 905 through Ethernet port 907. The bridge can also allow the servers 901-904 to communicate with each other. Ethernet port 907 of the bridge is connected to VF_Port 905. VF_Port 905 can be a separate device, a part of the FC switching element 900 or a part of the bridge 906. The VF_Port includes an Ethernet port 909 which connects to the Ethernet port 907 of the bridge 906, and an FCoE link endpoint (FCoE_LEP 910). The servers 901-904 send FCoE communications to the VF_Port 905 through the bridge 906. The FCoE communications are Ethernet frames that include Fibre Channel frames (or in other words, FC frames that are wrapped in, or tunneled over Ethernet frames). The bridge may treat these communications as ordinary Ethernet communications and forward them to port 907. The VF_Port receives these communications through port 909. Then, the FCoE_LEP unwraps the FC frames that were included in the incoming Ethernet communications. In other words, the FCoE_LEP converts the incoming Ethernet frames to FC frames. Then, the resultant FC frames are sent to the FC switching element 900 through an FC connection 911. More specifically, the resultant frames can be sent to another F_port or E_Port attached to the FC Switching element 900.

However, the VF_Port 905 is allowed to communicate with a single device only. Therefore, embodiments of the present invention provide that devices 901-904 are configured to simulate a single device having multiple entities and using N_Port_ID virtualization (NPIV) to communicate with the FC switch 900. Thus, each device from servers 901-904 can obtain a unique N_Port_ID through the NPIV assignment process. More specifically, a first device of devices 901-904 can send an FLOGI and obtain an N_Port_ID for itself. The other devices can consecutively send out FDISC messages to obtain their N_Port_IDs. The servers 901-904 can communicate among each other to ensure that the various messages (i.e., FLOGI, FDISC) are sent in correct order. When these commands get to VF_Port 905 they may look like commands sent out by a single N_Port using NPIV. Thus, the multiple devices 901-904 can appear as multiple virtual machines or multiple entities that are part of a single device that utilizes NPIV.

The FC switching element 900 may send communications (i.e., FC frames) back towards servers 901-904. These FC frames can be wrapped in Ethernet frames by the FCoE_LEP 910. The FCoE_LEP may address the Ethernet frames to one of servers 901-904 based on an N_Port_ID assigned to these devices and present in the FC frames received from the switching element 900.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for communication over a network, comprising
    providing a device comprising a plurality of distinct entities;
    associating a global address with the device, the global address being unique on the network;
    associating a plurality of subaddresses to respective entities of the plurality of distinct entities, wherein the subaddress is an expanded address stored in the data field of an FC frame; and
    allowing an entity to create a message, the message including the global address as a source address and a subaddress associated with the entity as a source subaddress.

2. The method of claim 1, wherein the message further includes a destination global address associated with a destination device and a destination subaddress associated with a destination entity that is part of the destination device.

3. The method of claim 2, wherein the network is selected from the group comprising a Fibre Channel (FC) network, a Converged Enhanced Ethernet (CEE) network, and a Fibre Channel over Ethernet (FCoE) network, and the global addresses are N_Port_IDs associated with the device and the destination device, respectively.

4. The method of claim 3, wherein the network is an FC network.

5. The method of claim 3, wherein the network is a CEE or an FCoE network.

6. The method of claim 1, wherein the subaddress is stored in the Network Header of an FC frame.

7. The method of claim 1, wherein the subaddress is stored in the Association Header of the FC frame.

8. The method of claim 3 wherein the subaddress is an address stored in the extended header field of an FC frame.

9. The method of claim 2, further comprising accessing a common server to discover the destination subaddress.

10. The method of claim 2, wherein all subaddresses for the entities of the device are unique for the device.

11. The method of claim 3, wherein the device is connected to a switch through a single connection and the number of entities comprised by the device is higher than the number of distinct N_Port_IDs supported by the switch by way of N_Port_ID virtualization (NPIV) For a single connection.

12. A method for communication over a network, comprising:
    providing a first device including a plurality of distinct entities;
    associating a global address with the first device, the global address being unique on the network;
    associating a plurality of local addresses with respective entities of the first device;
    providing a gateway connected to the first device;
    at the gateway, associating a plurality of subaddresses with respective entities of the first device, wherein the global address is an N_Port_ID and the subaddress is an expanded address other than an N_Port_ID;
    sending a communication by a first entity of the first device to the gateway, the communication including the local address associated with the first entity as a source address;
    removing the local address from the communication by the gateway, and replacing it with the global address of the first device and the subaddress of the first entity by the gateway; and forwarding the communication on the network by the gateway.

13. The method of claim 12, wherein the first device does not store any subaddress information.

14. The method of claim 12, wherein the network is selected from the group comprising a Fibre Channel (FC) network, a Converged Enhanced Ethernet (CEE) network, and a Fibre Channel over Ethernet (FCoE) network, and the global address and the local addresses are N_Port_IDs.

15. The method of claim 14, wherein the network is an FC network.

16. The method of claim 14, wherein the network is a CEE or FCoE network.

17. The method of claim 12, wherein the communication further includes a second local address associated with a second entity that is part of a second device, the second local address being included as a destination address, and the method further includes:
    removing the second local address from the communication by the gateway;
    adding a second global address to the communication, the second global address being associated with the second device; and
    adding a second subaddress to the communication, the second subaddress being associated with the second entity.

18. The method of claim 12, wherein the plurality of local addresses are unique for the first device and any other device the first device is expected to communicate with, but at least one of the plurality of local addresses is not unique over the entire network.

19. A device, connected to a network and comprising a plurality of distinct entities, a processor and a memory, the memory comprising software and the processor being configured to perform the following as a result of executing the software:
    obtain a global address and associate it with the device, the global address being unique on the network; and
    associate a plurality of subaddresses to respective entities of the plurality of distinct entities, the subaddress being an expanded address stored in the data field of an FC frame,
    wherein each entity of the plurality of distinct entities comprises an entity processor and an entity memory, the entity memory comprising entity software configured to create a message which includes the global address as a source address and a subaddress associated with the entity as a source subaddress and send the message over the network.

20. The device of claim 19, wherein the message further includes a destination global address associated with a destination device and a destination subaddress associated with a destination entity that is part of the destination device.

21. The device of claim 20, wherein the network is selected from the group comprising a Fibre Channel (FC) network, a Converged Enhanced Ethernet (CEE) network, and a Fibre Channel over Ethernet (FCoE) network, and the global addresses are N_Port_IDs associated with the device and the destination device, respectively.

22. The device of claim 21, wherein the network is an FC network.

23. The device of claim 21, wherein the network is a CEE or FCoE network.

24. The device of claim 19, wherein the subaddress is stored in the Network Header of an FC frame.

25. The device of claim 19, wherein the subaddress is stored in the Association Header of the FC frame.

26. The device of claim 21 wherein the subaddress is an address stored in the extended header field of an FC frame.

27. The device of claim 20, wherein the processor is further configured to access a common server to discover the destination subaddress.

28. The device of claim 20, wherein all subaddresses for the entities of the device are unique for the device.

29. The device of claim 21, wherein the device is connected to a switch through single connection and the number of entities comprised by the device is higher than the number of distinct N_Port_IDs supported by the switch by way of N_Port_ID virtualization (NPIV) for a single connection.

30. A networked system comprising a first device comprising a plurality of distinct entities, and a gateway connected to the first device and to a network,
the first device being configured to:
obtain a global address and associate it with the first device, the global address being unique on the network; and
associate a plurality of local addresses with respective entities of the first device,
a first entity of the plurality of entities being configured to send a communication to the gateway, the communication including the local address associated with the first entity as a source address,
the gateway being configured to:
associate a plurality of subaddresses with respective entities of the first device, wherein the global address is an N_Port_ID and the subaddress is an expanded address other than an N_Port_ID;
remove the local address from the communication sent by the first entity, and replace it with the global address of the first device and the subaddress of the first entity by the gateway; and
forward the communication to the network.

31. The system of claim 30, wherein the first device does not store any subaddress information.

32. The system of claim 30, wherein the network is selected from the group comprising a Fibre Channel (FC) network and a Fibre Channel over Ethernet (FCoE) network, and the global address and the local addresses are N_Port_IDs.

33. The system of claim 32, wherein the network is en FC network.

34. The system of claim 32, wherein the network is an FCoE network.

35. The system of claim 30, wherein the communication further includes a second local address associated with a second entity that is part of a second device, the second local address being included as a destination address, and the gateway is further configured to:
remove the second local address from the communication;
add a second global address to the communication, the second global address being associated with the second device; and
add a second subaddress to the communication, the second subaddress being associated with the second entity.

36. The system of claim 30, wherein the plurality of local addresses are unique for the first device and any other device the first device is expected to communicate with, but at least one of the plurality of local addresses is not unique over the entire network.

37. A device, connected to a network and comprising a plurality of distinct entities and a networking circuit, the networking circuit being configured to perform the following:
obtain a global address and associate it with the device, the global address being unique on the network; and
associate a plurality of subaddresses to respective entities of the plurality of distinct entities, the subaddress being an expanded address stored in the data field of an FC frame,
wherein each entity of the plurality of distinct entities comprises an entity processor and an entity memory, the entity memory comprising entity software configured to create a message which includes the global address as a source address and a subaddress associated with the entity as a source subaddress and send the message over the network.

* * * * *